United States Patent

Staffin

[15] 3,677,404
[45] July 18, 1972

[54] MOVING BED FILTRATION METHOD
[72] Inventor: Herbert Kenneth Staffin, Colonia, N.J.
[73] Assignee: Procedyne Corporation, New Brunswick, N.J.
[22] Filed: Nov. 25, 1970
[21] Appl. No.: 92,592

[52] U.S. Cl. .............................210/67, 210/75, 210/152, 210/195, 210/268
[51] Int. Cl. ...................................B01d 23/10, B01d 33/16
[58] Field of Search ....................110/7 R, 8 R; 210/67, 152, 210/268, 75, 189, 193, 195

[56] References Cited

UNITED STATES PATENTS

| | | | |
|---|---|---|---|
| 3,279,603 | 10/1966 | Busse | 210/152 X |
| 3,486,621 | 12/1969 | Hirs | 210/152 X |
| 1,411,201 | 3/1922 | Barron | 210/268 |
| 3,351,030 | 11/1967 | Albertson | 110/7 |

Primary Examiner—Samih N. Zaharna
Attorney—Leonard S. Knox

[57] ABSTRACT

Apparatus utilizing a continuously-moving, continuously-regenerated filtration bed of granular material to filter materials that tend to obstruct porous media, operating in conjunction with a fluidized solids bed incinerator.

4 Claims, 6 Drawing Figures

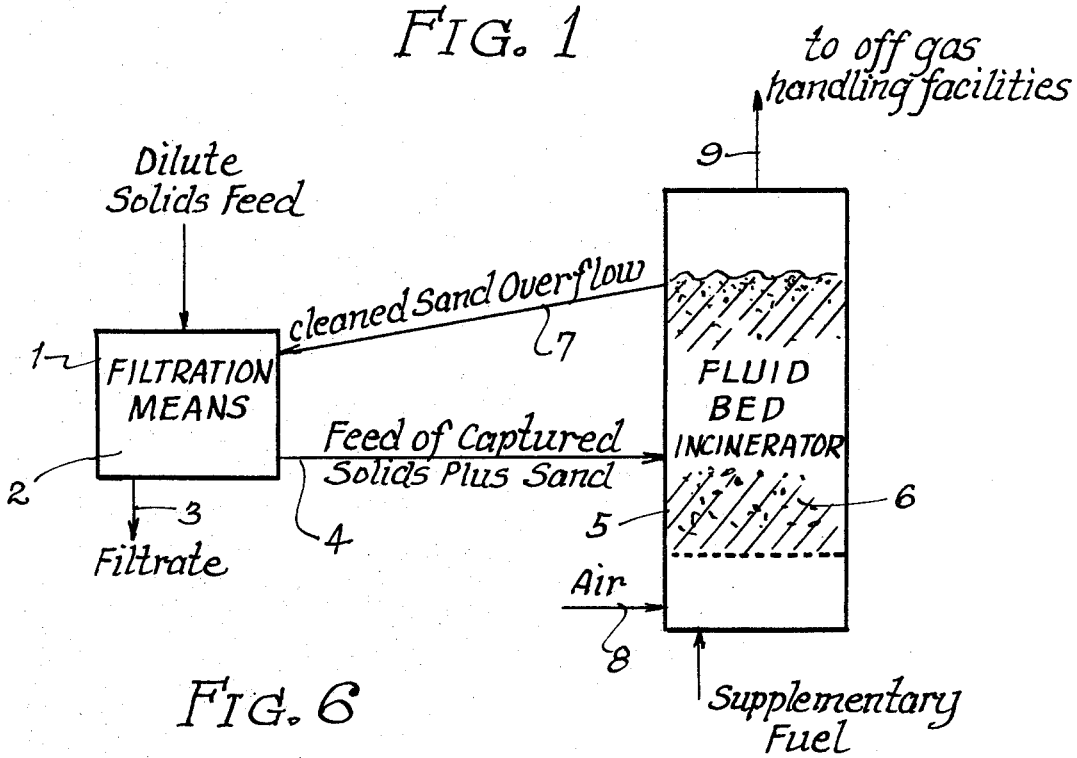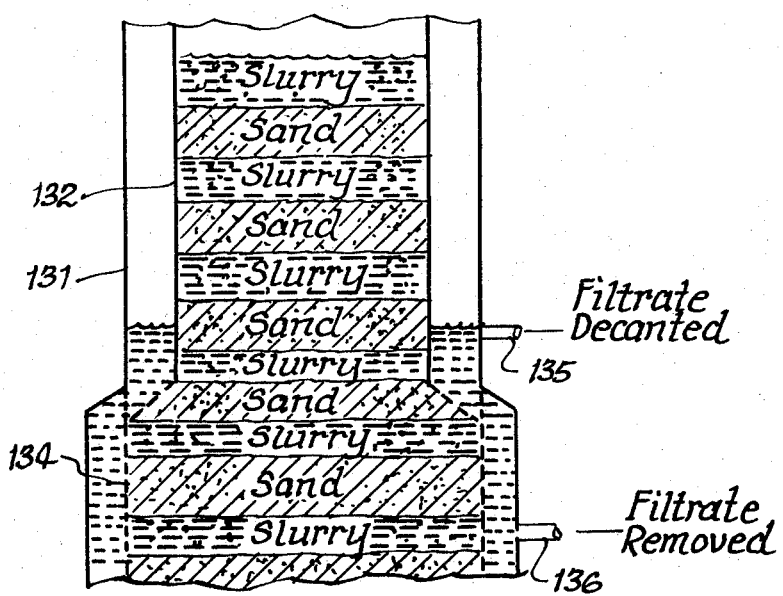

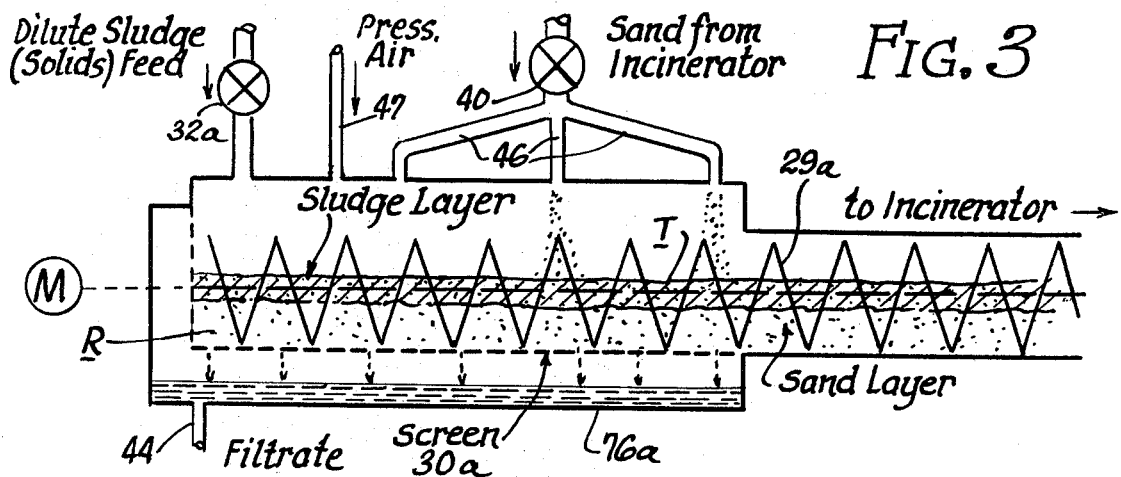
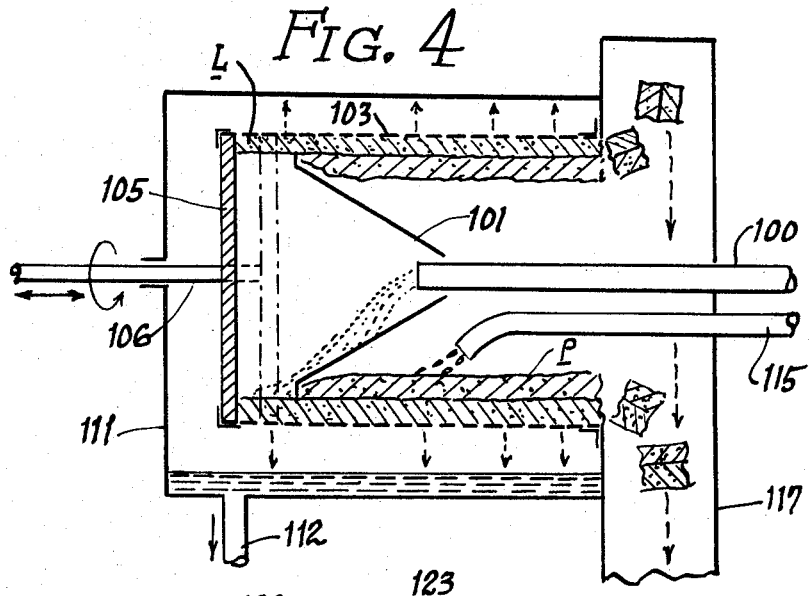
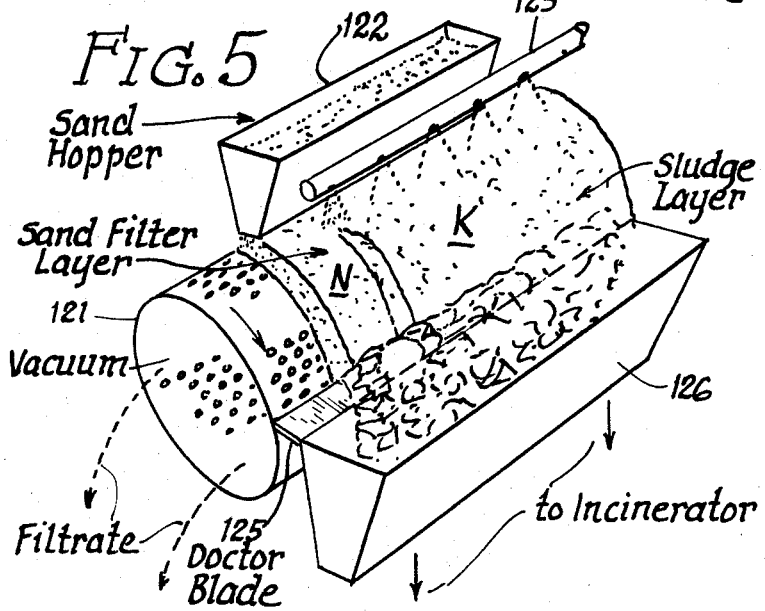

MOVING BED FILTRATION METHOD

BACKGROUND OF THE INVENTION

In many processing applications, it is necessary to separate solids from liquids to further react or to destroy the solids in a subsequent processing step. In many situations, the physical form of the solids prevents filtration through a porous or perforate medium in the classical manner because the solids plug the openings of the medium before any appreciable filtration has occurred. This problem is frequently encountered in handling streams of industrial or municipal wastes where the solids are "sludge-like," amorphous, colloidal, or extremely heterogeneous, all of which are properties which can make filtration impractical. Hereinafter, these various types of liquid-solid mixtures will be referred to for convenience as a "sludge."

SUMMARY OF THE INVENTION

The invention comprises a filtration process in which a bed of particulate material, e.g., sand, through which the slurry to be filtered is allowed to percolate, is disposed in a tower. Adjacent its lower end the tower has an interior screen in order that the larger part of the liquid component of the slurry may leave the bed for disposal to the sewer.

The downwardly-moving slurry, now devoid of a large part of its liquid content, is passed, together with the sand, by means of conveyors and an air lock into a second, or incineration tower which is constituted as a fluidized bed incinerator using sand as the medium. Feeding of the moist slurry and sand is to the bottom of the incinerator and above a porous bottom wall. Heated air is blown through the bottom wall and thence through the sand bed to incinerate the solids in the slurry and to convert remaining moisture into steam. The ash and heated air are disposed of in any convenient, practical manner to avoid pollution, for example, by passing the same to a separator from which the ash is collected and the heated air utilized beneficially.

Since the mass of slurry and sand entering the bottom of the incineration tower will displace the sand in the tower upwardly, a passage is provided between the space above the fluidized bed and the entrance to the filtration tower to constantly re-deliver the displaced sand to the filtration tower concurrently with the slurry being fed thereto.

The heated air from the separator may be utilized in a jacket surrounding the conveyor which delivers the charge of slurry, less a part of its water, to the incineration tower, whereby preheating of the charge is accomplished and economy realized. This same waste heat may be used to pre-heat the air supplied by a blower to the burner for the fluidized bed. After utilization in the jacket and burner air supply, the warm air is cooled in a heat exhanger and vented to atmosphere.

BRIEF DESCRIPTION OF THE DRAWINGS

FIG. 1 is a flow diagram to illustrate the basic principles of operation of the invention apparatus;

FIGS. 3, 4 and 5 illustrate modified embodiments; and

FIG. 6 is a diagrammatic partial view of an alternative form of filtration tower.

DESCRIPTION OF THE PREFERRED EMBODIMENT

Figure 2:
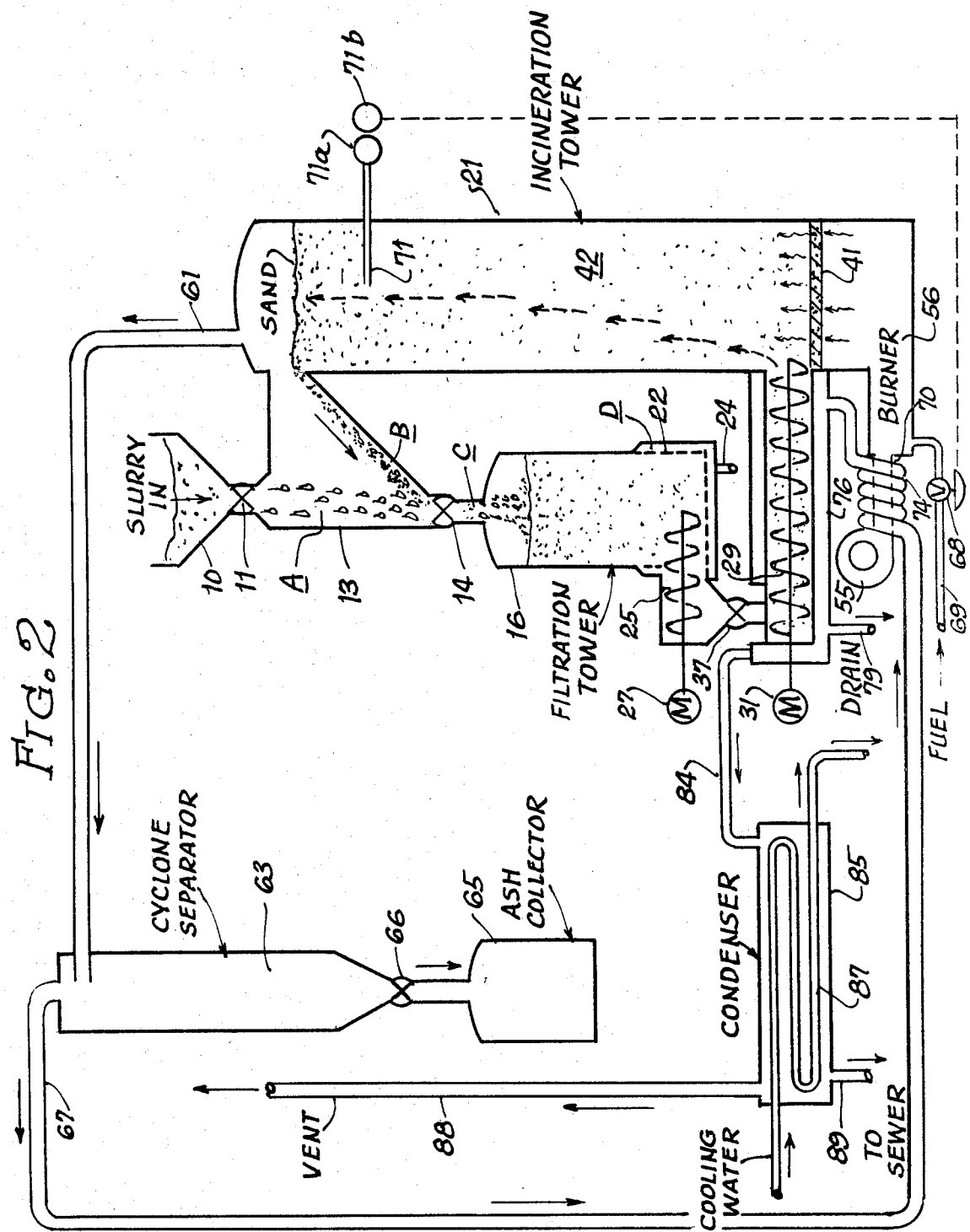
FIG. 2 is a diagram of a preferred form in which the principles of the invention may be embodied.

Adverting to FIG. 1, there is provided filtration means 1 arranged to receive a dilute solids feed which is to be converted into its solid and liquid components. The filter bed 2 is some granular material having a fusion temperature substantially higher than the incinerating temperature of the solids phase of the feed, for example, sand. The liquid phase is largely removed by gravity and delivered to waste at 3 while the solids, together with the filter bed, are transferred via a conduit 4 to the lower end of a fluid bed incinerator 5, which is constantly charged by the incoming sand. When the upwardly moving mass of sand 6 in the incinerator reaches a predetermined level, it overflows through a passage 7 for redelivery to the filtration means 1. Heated air is supplied at 8 to the fluid bed 6 to combust the solids in the charge. Off-gas and ash are disposed of by any suitable means connected at a flue 9.

Paunch manure will be used as an example of a waste product to which the invention is adapted. In general, the slurry fed to the apparatus will contain about 8 percent filterable solids. However, it is to be noted that, as the treatment proceeds, the percentage of water is gradually reduced to virtually zero and the solids are gradually transformed into ash.

Turning to a preferred form of the invention (FIG. 2), the slurry is loaded into a hopper 10 having at its bottom a rotary air lock 11 which, as it rotates, permits the slurry to pass into a chamber 13. A suitable air lock, known as a rotary seal feeder, is available from Detroit Stoker Company, Monroe, Michigan. The air lock mentioned and others to which reference will be made, permit delivery of the relatively solid material while preventing escape of gases. At the bottom of the chamber 13 is a second rotary air lock 14 to permit passage of the slurry and regenerated sand from the incinerator to pass into the filtration tower 16.

The charge to the filtration tower 16 will be a mixture of the raw charge A from the hopper 10, together with the regenerated sand B being transferred from the incineration tower 21 to be described subsequently. Sand of about 20 mesh is employed in the exemplificative process. This mixture, indicated at C, passes into the filtration tower 16, wherein the filtrate D escapes through a screen 22, formed around the lower interior portion of the tower. Other screening means may be employed as long as the same is capable of passing water at an efficient rate. A drain pipe 24 carries water to waste. If desired, a mechanical arrangement to avoid clogging of the filter may be employed but, since such expedients are well known, elaboration is deemed unnecessary.

The slurry, now having most of its water extracted, and admixed sand is removed from the lower end of the tower 16 by means of a screw conveyor 25 driven by a gear reducer motor 27 and is passed via an air lock 32, to a second screw conveyor 29 driven by a gear reducer motor 31.

The conveyor 29 forces the continuously moving mass into the lower end of the incineration tower or fluidized bed reactor 21. Such reactors are well known and comprise a chamber containing a bed of particulate material which is heated by external or internal means and maintained in a state of agitation by forcing air or gas therethrough. The air or gas may be heated prior to entry. Since fine particles are employed, the air or gas moving upwardly causes the mass of particles to behave in the manner of a fluid. A typical such reactor is disclosed in U. S. Pat. No. 3,350,915.

In the example, the reactor 21 comprises a cylindrical tank at the bottom of which is positioned a porous plate 41, e.g., of ceramic, capable of supporting the weight of the sand 42 and residue constituting the upwardly moving charge in the incinerator. The quantity of sand initially charged into the apparatus will be sufficient, when taken with the cross-sectional area of the tank 21, the incineration time, temperature, rate of charging and other pertinent factors to assure complete combustion of the organic material to ash and the return of the sand to the chamber 13.

To effect the reaction in the incinerator 21, air is delivered, by means of a blower 55, to an oil burner 56, or other heating means, and through the floor 41 to fluidize the bed 42 and thus efficiently incinerate the solids of the slurry interspersed with the sand and to drive off the remaining water as steam. That is to say, the burner 56 heats the charge in the incinerator 21 to maintain it at its operating temperature. Moreover, the blower 55 provides air to fluidize the bed 42 and to facilitate oxidation. When used for paunch manure, the incinerator 21 is maintained at a preferred temperature of 1400° F. to combust the paunch manure solids to combustion gases and sterile ash.

The ash and air are directed through a conduit 61 to the intake of a cyclone or other type of separator 63. The ash is deposited in a receptacle 65 via a rotary air lock 66, and the air is delivered to an exhaust pipe 67. A typical separator is available from Sprout-Waldron Company, Muncy, Pennsylvania.

A thermocouple 71 senses the temperature of the bed 42 and performs two functions; one, controlling a high-temperature alarm device 71a to provide an audible and/or visual signal in the event the temperature rises or falls from a fixed point due to malfunction, and two, a device 71b controlling a valve 68 in the fuel line 69, to regulate feeding of fuel and/or air of combustion to the burner in accordance with the demands of the incineration process.

For reasons of economy, the hot air leaving the separator 63 through the pipe 67 is delivered to a jacket 74 surrounding the air inlet pipe 70 to the burner 56 and thence to a jacket 76 surrounding the conveyor 29, a drain pipe 79 being provided to carry condensate to waste. Thus the charge being delivered to the reactor 21 by the conveyor 29 is preheated to minimize the temperature gradient between the top and bottom of the reactor. If desired, the feed of preheating air to the pipe 70 and jacket 76 may be in parallel instead of in series.

The spent air from the jacket 76 is delivered, via a pipe 84 to a heat exchanger 85, e.g., a condenser, wherein it is cooled by water circulated through a coil 87 and discharged through a vent 88 to atmosphere. A drain pipe 89 carries the condensate to waste.

It will be noted that the air locks 11 and 14 rotate continuously during operation and effectively seal the chamber 13, except to allow entry and exit of the charge. Accordingly, the spent air from the reactor 21 is caused to take an exit path through the conduit 61 to the separator 63.

It will also be understood that the incinerating arrangement, including the use of a fluidized bed, relies on the heat of combustion of the solids. However, supplementary heat may be supplied by utilizing the burner 56 which delivers its heat through the bottom plate 41. The quantity of supplementary heat thus delivered is regulated by means of the thermocouple 71, device 71b and valve 68.

A modification is shown diagrammatically in FIG. 3, wherein the conveyor 29a and its housing 30a are similar to the conveyor 29 and its housing 76, described in connection with FIG. 2. In this example a collecting jacket 76a surrounds a rearward portion of the conveyor and the coextensive part of the housing 30a is perforate. Regenerated sand from the incinerator, such as 21 of FIG. 2, is fed through an air lock 40 and into branches 46 to distribute the sand in a layer $\underline{R}$ of predetermined thickness over some extended area of the conveyor 29a, which is at rest during charging. The dilute slurry enters at a rotary air lock 32a, corresponding with the air lock 32 of FIG. 2, the lock being opened for a sufficient length of time to provide a layer $\underline{T}$ over the still-quiescent bed of sand. Compressed air is supplied at pipe 47 to facilitate separation of water from the charge which passes through the screen 30a into the collecting jacket 76a and thence to waste at 49. The residue, namely, solids and a substantially lower percentage of water and the sand are now traversed toward and into the lower end of the incinerator for treatment in the manner previously described. The conveyor is stopped again and the steps are repeated. By employing two or more units delivering their respective charges to the incinerator and operating them in staggered relation, the feed can be made to approximate continuous-feed operation.

FIG. 4 illustrates schematically still another modification utilizing a pusher-plane centrifuge, such as the Type S manufactured by Baker Perkins, Saginaw, Michigan, Model S-87.5 HP, 1.5 TPH as the filtration means of FIG. 1. The regenerated sand is supplied through a pipe 100 and is delivered to the interior of a rotating funnel 101 from which it is thrown off onto a cylindrical screen 103, which is arranged to rotate with the funnel. Centrifugal force maintains a layer of sand $\underline{L}$ on the inner wall of the screen 103. Slurry $\underline{P}$ is delivered through a pipe 115 and on to the layer L of sand. Due to rotation of the screen 103 water is extracted from the slurry and accumulates in the bottom of a housing 111 from which it leaves via a drain pipe 112.

A circular pusher plate 105, having a sliding fit within the screen 103, is carried at one end of a shaft 106 rotating at the same speed as the screen and funnel and is reciprocated axially over a short stroke, for example, two inches, between the adjacent end of the cylindrical screen 103 and the larger end of the funnel 101. The plate 105 acts to shift the mass of sand and sludge to the right, at which point the mass is dislodged from the screen by centrifugal force and gravity and drops into a conduit 117 for delivery to the incinerator for processing and recovery of the sand for re-use in the apparatus.

FIG. 5 shows a further modification in which a vacuum filter is employed in place of the filtration tower 16 of FIG. 2, to accomplish filtration. A rotating perforate drum 121 is connected to vacuum in such manner that suction is applied from within the drum. Regenerated sand and slurry are delivered on to the drum at essentially the same place, viz. sand is delivered through a hopper 122 and is deposited as a layer $\underline{N}$ on the drum which, in the example, is shown to rotate about its axis in a clockwise direction, and the slurry is delivered through a pipe 123 from which it exits through holes for deposit as a second layer $\underline{K}$ on the sand layer $\underline{N}$. A substantial part of the water is drawn radially into the center of the drum 121, the sand layer $\underline{N}$ serving as the filter.

At some point bearing a predetermined relation to the regions at which the sand and sludge are deposited on the drum, there is a doctor blade 125 which scrapes the more or less dried sludge and sand from the drum and diverts the same into a hopper 126. A suitable conveyor carries the material to the incinerator.

A modified form of the filtration tower 16 of FIG. 2 is illustrated diagrammatically in FIG. 6. In this case the regenerated sand and slurry are delivered at the top of the filtration tower in alternated layers. To this end the air lock 14 is replaced by two air locks (not shown) arranged to open and close passages feeding sand and slurry respectively, on an alternated basis. Thus, a layer of sand will be deposited and then a layer of slurry, as shown, and the layers of sand will constitute a plurality of filtering beds functioning similarly to the bed of the filtration tower in FIG. 2. In effect, each bed partakes in the filtering action seriatim and "blinding" of the filter is precluded. In this modified tower an outer imperforate wall 131 is spaced away from an inner imperforate wall portion 132, this latter continuing as a perforate enlarged lower wall portion 134. Alternatively, the wall portion 132 may be perforate. Water draining from the slurry will accumulate in the space between the walls, in the case of an imperforate wall 132, rising in said space. In the case of a perforate wall 132, the water enters the space from below and above the lower margin of the wall. In either case the water is decanted, via a pipe 135, to waste.

As the bed moves downwardly, water continues to drain off through the screen 134 and leaves the tower through a pipe 136 to waste.

It will be understood that the sludge (slurry less a major part of its water content) and sand are delivered to a conveyor (not shown) below the tower, similarly to the arrangement of FIG. 2, for incineration of the solids, elimination of the residue of water, and regeneration of the sand.

EXAMPLE

A feed stock consisting of 1465 lbs./hour of cellulosic solids and 2780 lbs./hour of free draining water are fed to the filter. The solids in turn are compressible and contain up to 1260 lbs./hour of moisture which are bound in the interstices of the solid agglomerate. There is also added to the filter, to act as the filtering medium, 808 lbs./hour of clean sand recycled from the incinerator.

The filtrate contains 2572 lbs./hour of water, 3 lbs./hour of suspended solids and 13 lbs./hour of fine sand particles. The feed to the incinerator as transferred by the screw conveyor contains 808 lbs./hour of sand, 228 lbs./hour free water and 1442 lbs./hour of solids.

The incinerator uses 43 gals./hour of fuel oil in the combustion process and produces 1928 scfm*(*scfm = cubic feet per minute at standard room temperature and pressure) of combustion gases having the following analysis: 4% $O_2$, 9.5% $CO_2$, 36.5% $H_2O$, 50% $N_2$. The gases are passed through the cyclone separator in which traces of sand are removed and through a scrubber in which traces of soluble impurities in the gases are removed. Stack gases from the scrubber contain 13% $H_2O$, 5% $O_2$ and 69% $N_2$.

What is claimed is:

1. The method for disposing of sludge comprising essentially organic matter and water comprising the steps of:
   a. providing a filtration chamber continuously delivering to the top of said chamber non-combustible filtration particles to form in said chamber a continuously-downwardly moving bed of said filtration particles;
   b. delivering the sludge to continuously the top of the bed concurrently with the filtration particles for joint movement therewith;
   c. removing a portion of the liquid content of the sludge from the bed while said bed and sludge are moving;
   d. providing an incinerating chamber;
   e. transferring the moving mass from the bottom of the filtration chamber to the bottom of the incinerating chamber to form an upwardly moving incinerating bed;
   f. forcing a gas through the bottom of the incinerating bed to agitate the same to provide fluidized solids action;
   g. concurrently heating the incinerating bed to combust said organic matter and drive off the residual liquid and continuously returning the filtration particles from the top of the incineration bed to the place of delivery of the sludge to the filtration bed for re-use thereof.

2. The method according to claim 1 comprising the further step of separating the ash and gases of combustion.

3. The method in accordance with claim 2, comprising the further step of collecting the ash for non-pollutive disposal.

4. The method in accordance with claim 1, comprising the further step of preheating the particles, solids and residual liquid prior to transfer thereof to the incinerating means.

* * * * *

UNITED STATES PATENT OFFICE
CERTIFICATE OF CORRECTION

Patent No. 3,677,404          Dated July 18, 1972

Inventor(s) Herbert Kenneth Staffin

It is certified that error appears in the above-identified patent and that said Letters Patent are hereby corrected as shown below:

Claim 1, steps a. and b. should read:

-- a. providing a filtration chamber;

b. continuously delivering to the top of said chamber non-combustible filtration particles to form in said chamber a continuously downwardly moving bed of said filtration particles; --.

Signed and sealed this 19th day of December 1972.

(SEAL)
Attest:

EDWARD M. FLETCHER, JR.
Attesting Officer

ROBERT GOTTSCHALK
Commissioner of Patents